United States Patent [19]

Greenspan et al.

[11] 3,928,134

[45] Dec. 23, 1975

[54] MICROBIOLOGICAL REDUCTION OF 7-(2(3-HYDROXY-1-OCTENYL)-5-OXO-3-CYCLOPENTEL-1-YL)-5-HEPTENOIC ACID AND RELATED COMPOUNDS

[75] Inventors: George Greenspan, Narberth, Pa.; Michael R. G. Leeming, Canterbury, England

[73] Assignee: American Home Products Corporation, New York, N.Y.

[22] Filed: Oct. 23, 1974

[21] Appl. No.: 517,126

Related U.S. Application Data

[62] Division of Ser. No. 420,406, Nov. 30, 1973, abandoned.

[52] U.S. Cl. .................................. 195/30; 195/51 R
[51] Int. Cl.² ............................................. C12D 1/02
[58] Field of Search ............................. 195/30, 51 R

[56] References Cited

UNITED STATES PATENTS

| | | | |
|---|---|---|---|
| 3,726,765 | 4/1973 | Leeming et al. | 195/30 |
| 3,788,947 | 1/1974 | Hsu et al. | 195/30 |

*Primary Examiner*—Alvin E. Tanenholtz
*Attorney, Agent, or Firm*—Royal E. Bright

[57] ABSTRACT

Reduction of 7-(2-[(3R)-3-hydroxy-1-octenyl]-5-oxo-3-cyclopenten-1-yl)-5-heptenoic acid, and its methyl ester, acetate by fungi of the genera Corynespora is disclosed. The product 7-(2-[(3R)-3-hydroxy-1-octenyl]-5-oxo-cyclopentyl)-5-heptenoic acid(11-deoxy-15-epi-PGE$_2$), which is novel, is useful as an intermediate for the synthesis of other physiologically active prostaglandins.

2 Claims, No Drawings

MICROBIOLOGICAL REDUCTION OF 7-(2(3-HYDROXY-1-OCTENYL)-5-OXO-3-CYCLOPENTEL-1-YL)-5-HEPTENOIC ACID AND RELATED COMPOUNDS

This is a division of application Ser. No. 420,406 filed Nov. 30, 1973, now abandoned.

BACKGROUND OF THE INVENTION

The use of the fungus *Corynespora cassiicola* IMI 56007 to hydrolyze the ester functions of 7-(2[(3R)-3-hydroxy-1-octenyl]-5-oxo-3-cyclopenten-1-yl)-5-heptenoic acid, methyl ester, acetate is described in U.S. Pat. No. 3,726,765.

The present invention provides a method of directly converting ring unsaturated prostaglandins of the 15-epi $PGA_2$ type, that is, 7-(2[(3R)-3-hydroxy-1-octenyl]-5-oxo-3-cyclopenten-1-yl)-5-heptenoic acids, and its methyl ester, acetate, to 11-deoxy-15-epi-$PGE_2$.

SUMMARY OF THE INVENTION

The invention sought to be patented in its principal process aspect is described as residing in the concept of a process for the preparation of 7-(2-[(3R)-hydroxy-1-octenyl]-5-oxo-cyclopentyl)-5-heptenoic acid which comprises treating 7-(2-[(3R)-3-hydroxy-1-octenyl]-5-oxo-cyclopenten-1yl)-5-heptenoic acid, or its methyl ester, acetate, with a fungus of the genus Corynespora.

The tangible embodiment produced by the principal process concept of the invention possesses the inherent general physical property of being an oily liquid, being substantially insoluble in water, and generally soluble in such common organic solvents such as ethers, ketones, and esters, e.g. diethyl ether, acetone, and ethyl acetate.

Examination of the product produced by the aforesaid process reveals, upon infrared, ultraviolet, nuclear magnetic resonance, mass spectral, and thin layer chromatographic analyses, spectral data, and migration rates supporting the molecular structure hereinbefore set forth.

The tangible embodiment produced by the principal process aspect of the invention possesses the inherent applied use characteristic of being an intermediate in the synthesis of other useful prostaglandins.

The invention sought to be patented in a subgeneric process aspect is described as residing in the concept of a process for the preparation of 7-(2-[(3R)-3-hydroxy-1-octenyl]-5-oxo-cyclopentyl)-5-heptenoic acid which comprises treating 7-(2-[(3R)-3-hydroxy-1-octenyl]-5-oxo-3-cyclopenten-1-yl)-5-heptenoic acid; or its methyl ester, acetate with a fungus of the species *Corynespora cassiicola*.

The invention sought to be patented in its composition aspect is described as residing in the concept of the chemical compound 7-(2-[(3R)-3-hydroxy-1-octenyl]-5-oxo-cyclopentyl)-5-heptenoic acid.

The tangible embodiment of the composition aspect of the invention possesses the inherent general physical property of being an oily liquid, being substantially insoluble in water, and generally soluble in common organic solvents such as esthers, ketones, and esters, e.g. diethyl ether, acetone, and ethyl acetate.

Examination of the compound reveals, upon infrared, ultraviolet, nuclear magnetic, mass spectral, and thin layer chromatographic analyses, spectral data and a migration rate supporting the molecular structure hereinbefore set forth. The aforementioned physical characteristics, taken together with the nature of the starting material, further confirm the molecular structure hereinbefore set forth.

The tangible embodiment of the composition aspect of the invention possesses the inherent applied use characteristic of being an intermediate in the synthesis of other useful prostaglandins.

DESCRIPTION OF THE PREFERRED EMBODIMENTS

In the process of the present invention, to produce, for example 7-(2-[(3R)-3-hydroxy-1-octenyl]-5-oxo-cyclopentyl)-5-heptenoic acid (11-deoxy-15-epi-$PGE_2$), 7-(2-[(3R)-3-hydroxy-1-octenyl]-5-oxo-3-cyclopenten-1-yl)-5-heptenoic acid, methyl ester, acetate is contacted with a suspension of the mycelial cells of the fungus *Corynespora cassiicola* IMI 56007 in a substantially aqueous fermentation medium. The temperature and incubation time are not critical, and one skilled in the art will recognize that variations thereof will merely affect the attainment of optimum yield. Preferably the incubation period may last from about 18 to about 24 hours, typically about 22 hours, while the temperature is preferably maintained from about room temperature to about 30°, typically 28°. The pH of the aqueous medium may vary from about 4 to about 8, and the fermentation is ideally carried out with agitation although this also is not critical. The isolation of 11-deoxy-15-epi PGE $_2$ may be accomplished by standard techniques, for example, partitioning of the reaction mixture with an immiscible solvent followed by column chromatography of the material extracted by the organic phase.

While the process of the invention has been illustrated above by the use of 7-(2-[(3R)-3-hydroxy-1-octenyl]-5-oxo-3-cyclopenten-1-yl)-5-heptenoic acid, methyl ester, acetate as the starting material, and *Corynespora cassiicola* IMI 56007 as the organism accomplishing the reduction, the substitution of the other starting material and/or organisms contemplated as equivalents within the scope of the invention will be obvious to one skilled in the art. Thus for *Corynespora cassiicola* IMI 56007 one may, for example, substitute other fungi of the genus Corynespora, and one may also, for example, substitute for 7-(2-[(3R)-3-hydroxy-1-octenyl]-5-oxo-3-cyclopenten-1-yl)-5-heptenoic acid, methyl ester, acetate, 7-(2-[(3R)-3-hydroxy-1-octenyl]-5-oxo-cyclopenten-1-yl)-5-heptenoic acid.

While not critical, for optimum yield, the composition of the nutrient medium employed may vary. Preferably, for organisms of the genus Corynespora, a corn steep liquor medium, such as described hereinbelow is preferred.

The starting materials for the practice of the invention, namely the aforementioned 7-(2-[(3R)-3-hydroxy-1-octenyl]-5-oxo-3-cyclopenten-1-yl)-5-heptenoic acid and its mono and diesters are well-known in the literature. For example, 7-(2-[(3R)-3-hydroxy-1-octenyl]-5-oxo-3-cyclopenten-1-yl)-5-heptenoic acid methyl ester, acetate may be obtained from the coral *Plexaura homomalla* by a procedure as described by A. Weinheimer and R. Spraggins in Tetrahedron Letters, 59, 5185, (1969). The diester substituents be hydrolyzed to the free hydroxyl and carboxyl functions by a procedure as described by Leeming and Greenspan in U.S. Pat. No. 3,726,765, Apr. 10, 1973.

7-(2-[(3R)-3-hydroxy-1-octenyl]-5-oxo-cyclopentyl)-5-heptenoic acids is useful, for example, as an intermediate for the synthesis of other prostaglandins which are bronchodilators. A typical synthesis is described in pending application Serial No. 383,007, Attorney's docket No. AHP-5965, filed July 26, 1973, and copending with this application. Therein 7-(2-[(3R)-3-hydroxy-1-octenyl]-5-oxo-cyclopentenyl)-5-heptenoic acid is oxidized to 7-[3-(3-oxo-1-octenyl)-5-oxo-cyclopentenyl]-5-heptenoic acid and substitutents introduced into the 3-oxo group on the octenyl side chain, and the various double bonds are selectively reduced. Among the products thereof are the previously known compounds 11-deoxy-15-methyl-dihydro-PGE$_1$ (U.S. Pat. No. 3,671,570, June 20, 1972).

The following example further illustrates the best mode contemplated by the inventors for carrying out the invention:

7-(2-[(3R)-3-Hydroxy-1-Octenyl)-5-Oxo-Cyclopentyl]-5-Heptenoic Acid

A. Three agar slants of *Cornyespora cassiicola* IMI 56007 are each washed with 5 ml. of distilled water, and one half of each of the cell suspensions transferred to 6 one-liter flasks containing 200 ml. of the following medium:

| Corn Steep Liquor | 5.0 g |
| Dextrose | 20.0 g |
| Peptone | 20.0 g |
| Distilled Water | 1000 ml |

The medium is autoclaved for 20 inches at 121°C.

The flasks are incubated at 28° on a rotary shaker, 250 rpm, 2 inch diameter of rotation.

After 67 hours of growth, 10% mycelial transfers are made to seven 2-liter flasks containing 400 ml. of the same medium, and to a single 1-liter flask with 200 ml. of medium. The flasks are incubated for 23 hours, as earlier, and then adjusted in pH to 4.2–4.3 with 6 N HCl.

The compound to be modified, 7-(2-[(3R)-3-hydroxy-1-octenyl]-5-oxo-cyclopenten-1-yl)-5-heptenoic acid, methyl ester, acetate, is diluted in ethanol to give a solution of 100 mg/ml. Four ml., (400 mg), are added to each of the seven 2-liter flasks and 2 ml. added to the single 1-liter flask.

After 20 hours of shaking on the rotary shaker, the flasks are harvested, and the fermentation mixture filtered. The mycelium is washed with 500 ml. of warm water, and the water wash is combined with the filtrate. The combined filtrate is acidified to pH 4.5 with acetic acid and extracted with ether. After washing and drying, the extract is evaporated and the residue chromatographed on silica with ethyl acetate-benzene to obtain the title product, 0.35 g. I.R. Analysis: $\lambda_{max}^{film}$ 3.0 (shoulder), 3.4, 5.75 7.1, 8.15, 8 65, 10.3$\mu$.

The subject matter which the applicants regard as their invention is particularly pointed out and claimed as follows:

1. A process for the preparation of 7-(2-[(3R)-3-hydroxy-1-octenyl]-5-oxo-cyclopentyl)-5-heptenoic acid which comprises:

a. incubating 7-(2-[(3R)-3-hydroxy-1-octenyl]-5-oxo-3-cyclopenten-1-yl)-5-heptenoic acid; or its methyl ester, acetate with a fungus of the species *Corynespora cassiicola;* and b. isolating the reduced acid product.

2. A process as described in claim 1 wherein 7-(2-[(3R)-3-hydroxy-1-octenyl]-5-oxo-3-cyclopenten-1-yl)-5-heptenoic acid, methyl ester, acetate is treated with *Corynespora cassiicola* IMI 56007.

* * * * *